United States Patent
Freeman

(10) Patent No.: US 8,236,053 B1
(45) Date of Patent: Aug. 7, 2012

(54) 2-AMINO BENZOPHENONE UV-ABSORBERS FOR OPHTHALMIC LENS MATERIALS

(75) Inventor: Charles Freeman, Granbury, TX (US)

(73) Assignee: Novartis AG, Basel (CH)

( * ) Notice: Subject to any disclaimer, the term of this patent is extended or adjusted under 35 U.S.C. 154(b) by 366 days.

(21) Appl. No.: 12/575,645

(22) Filed: Oct. 8, 2009

Related U.S. Application Data

(60) Provisional application No. 61/103,654, filed on Oct. 8, 2008.

(51) Int. Cl.
*A61F 2/16* (2006.01)

(52) U.S. Cl. ......... 623/6.6; 623/5.16; 351/162; 523/106

(58) Field of Classification Search ............... 623/5.16, 623/6.6, 6.56; 351/162–163; 523/106
See application file for complete search history.

(56) References Cited

U.S. PATENT DOCUMENTS

| | | | |
|---|---|---|---|
| 3,162,676 A * | 12/1964 | Goldberg et al. .............. 560/221 |
| 4,310,650 A | 1/1982 | Gupta et al. |
| 4,390,676 A | 6/1983 | Loshaek |
| 4,716,234 A | 12/1987 | Dunks et al. |
| 4,803,254 A | 2/1989 | Dunks et al. |
| 5,290,892 A | 3/1994 | Namdaran et al. |
| 5,331,073 A | 7/1994 | Weinschenk, III et al. |
| 5,470,932 A | 11/1995 | Jinkerson |
| 5,487,885 A | 1/1996 | Sovak et al. |
| 5,528,322 A | 6/1996 | Jinkerson |
| 5,543,504 A | 8/1996 | Jinkerson |
| 5,637,726 A | 6/1997 | Collins et al. |
| 5,662,707 A | 9/1997 | Jinkerson |
| 5,681,833 A * | 10/1997 | Castro Pineiro et al. ..... 514/215 |
| 5,693,095 A | 12/1997 | Freeman et al. |
| 5,741,924 A | 4/1998 | Sovak et al. |
| 6,015,874 A | 1/2000 | Hiratani |
| 6,166,218 A | 12/2000 | Ravichandran et al. |
| 6,244,707 B1 | 6/2001 | Faubl |
| 6,528,602 B1 | 3/2003 | Freeman et al. |
| 6,806,337 B2 | 10/2004 | Schlueter et al. |
| 6,846,897 B2 | 1/2005 | Salamone et al. |
| 6,852,793 B2 | 2/2005 | Salamone et al. |
| 6,872,793 B1 | 3/2005 | Schlueter et al. |
| 7,037,954 B2 | 5/2006 | Baba et al. |
| 7,067,602 B2 | 6/2006 | Benz et al. |
| 7,101,949 B2 | 9/2006 | Salamone et al. |
| 7,278,737 B2 | 10/2007 | Mainster et al. |
| 7,326,423 B2 | 2/2008 | Pearson et al. |

(Continued)

FOREIGN PATENT DOCUMENTS

CN     1727338     2/2006

(Continued)

OTHER PUBLICATIONS

Takakis, et al., "Preparation of Benzofuroxans and Benzofurazans of 2,3,4,5-Tetrahydrobenzo[b][1.4]dioxocin and Related Compounds," J. Heterocyclic Chem., 1990, pp. 177-181, vol. 27, (Feb. 1990).

(Continued)

*Primary Examiner* — Paul Prebilic
(74) *Attorney, Agent, or Firm* — Patrick M. Ryan

(57) ABSTRACT

Ophthalmic device materials comprising 2-amino benzophenone UV-absorbing compounds are disclosed. The ophthalmic device materials are particularly useful in intraocular lenses.

13 Claims, 1 Drawing Sheet

UV-Visible Transmission Spectra for IOL Materials Containing Compounds II - IV

U.S. PATENT DOCUMENTS

| | | |
|---|---|---|
| 2001/0024697 A1* | 9/2001 | Baron et al. ............ 427/487 |
| 2006/0115516 A1 | 6/2006 | Pearson et al. |
| 2006/0252850 A1 | 11/2006 | Jani et al. |
| 2007/0092830 A1 | 4/2007 | Lai et al. |
| 2007/0092831 A1 | 4/2007 | Lai et al. |
| 2008/0242818 A1 | 10/2008 | Benz et al. |
| 2008/0266519 A1 | 10/2008 | Schlueter |
| 2009/0043007 A1 | 2/2009 | Weinschenk, III et al. |
| 2009/0043105 A1 | 2/2009 | Weinschenk, III et al. |

FOREIGN PATENT DOCUMENTS

| | | |
|---|---|---|
| EP | 0455058 A2 | 11/1991 |
| EP | 0913713 B1 | 12/2002 |
| EP | 1033590 | 7/2008 |
| JP | 08176139 | 7/1996 |
| JP | 2005053058 | 3/2005 |
| JP | 2009013148 | 1/2009 |
| WO | WO9414410 A1 | 7/1994 |
| WO | WO9830900 A2 | 7/1998 |
| WO | WO2006057824 A2 | 6/2006 |
| WO | WO2008109624 A2 | 9/2008 |

OTHER PUBLICATIONS

Ricker, Jochen, et al., "Ultraviolet Stabilizers of the 2-(Hydroxyphenyl)benzotriazole Class. Influence of Substituents on Structure and Spectra," J. Phys. Chem. 1992, pp. 10225-10234, vol. 96, (Jul. 1992).

Kador, et al., "Identification of an Aldose Reductase Inhibitor Site by Affinity Labeling," Biorganic & Medicinal Chemistry, 1995, pp. 1313-1324, vol. 3, No. 10, (Jun. 1995).

Kador, et al., "Irreversible aldose reductase inhibitors," Enzymology and Molecular Biology of Carbonyl Metabolism, 1987, pp. 353-365, (Feb. 1987).

* cited by examiner

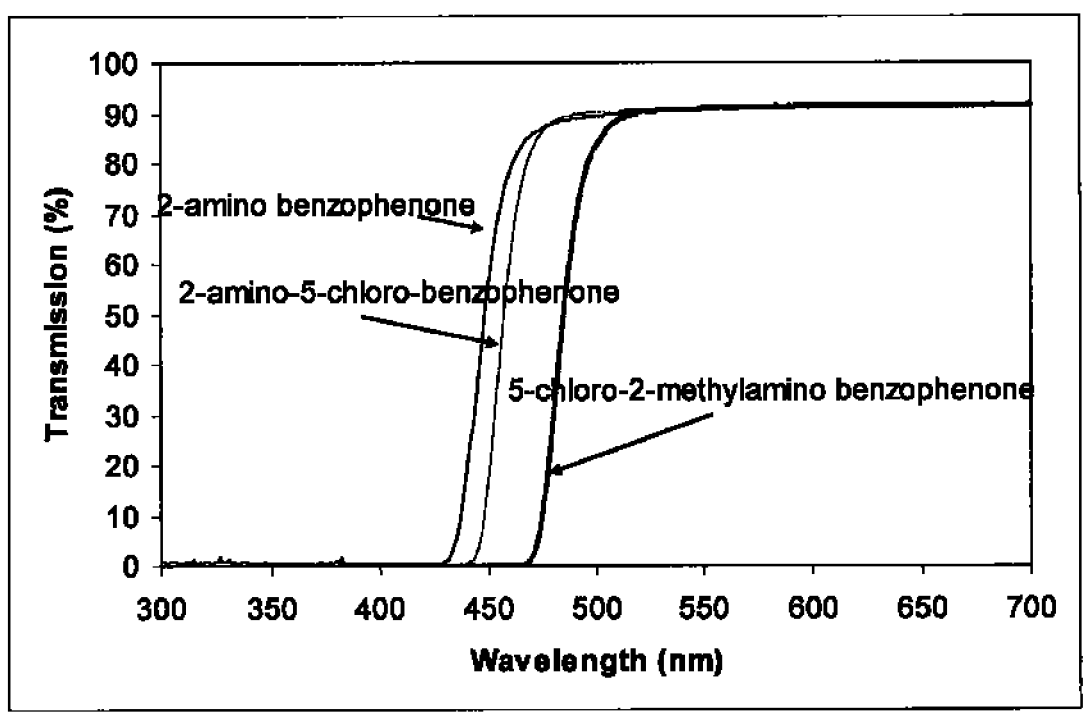
UV-Visible Transmission Spectra for IOL Materials Containing Compounds II - IV

2-AMINO BENZOPHENONE UV-ABSORBERS FOR OPHTHALMIC LENS MATERIALS

CROSS-REFERENCE TO RELATED APPLICATIONS

This application claims priority under 35 U.S.C. §119 to U.S. Provisional Patent Application No. 61/103,654, filed Oct. 8, 2008, the entire contents of which are incorporated herein by reference.

FIELD OF THE INVENTION

This invention is directed to ophthalmic lens materials. In particular, this invention relates to ultraviolet light absorbers that are suitable for use in ophthalmic lens materials.

BACKGROUND OF THE INVENTION

Many UV light absorbers are known as ingredients for polymeric materials used to make ophthalmic lenses and, in particular, intraocular lenses. UV absorbers are preferably covalently bound to the polymeric network of the lens material instead of simply physically entrapped in the material to prevent the absorber from migrating, phase separating or leaching out of the lens material. Such stability is particularly important for implantable ophthalmic lenses where the leaching of the UV absorber may present both toxicological issues and lead to the loss of UV blocking activity in the implant.

Numerous copolymerizable benzotriazole, benzophenone and triazine UV absorbers are known. Many of these UV absorbers contain conventional olefinic polymerizable groups, such as methacrylate, acrylate, methacrylamide, acrylamide or styrene groups. Copolymerization with other ingredients in the lens materials, typically with a radical initiator, incorporates the UV absorbers into the resulting polymer chain. Incorporation of additional functional groups on a UV absorber may influence one or more of the UV absorber's UV absorbing properties, solubility or reactivity. If the UV absorber does not have sufficient solubility in the remainder of the ophthalmic lens material ingredients or polymeric lens material, the UV absorber may coalesce into domains that could interact with light and result in decreased optical clarity of the lens.

Examples of polymeric ophthalmic lens materials that incorporate UV absorbers can be found in U.S. Pat. Nos. 5,290,892; 5,331,073 and 5,693,095.

In addition to blocking UV light, some ophthalmic lenses also block blue light. See, for example, U.S. Pat. Nos. 5,470,932 and 5,543,504. These lenses block both types of light by using two chromophores: a UV absorber and a yellow dye.

There is a need for UV absorbers that are suitable for use in implantable ophthalmic lenses and are capable of blocking not only UV light (400 nm and below) but also blocking at least some light between 400-450 nm.

SUMMARY OF THE INVENTION

The present invention provides ophthalmic device materials comprising UV absorbers that block not only UV light but also at least some light in the 400-450 nm range. The ophthalmic device materials are suitable for a variety of ophthalmic devices, including contact lenses, and are particularly useful in implantable lenses, such as intraocular lenses (IOLs).

BRIEF DESCRIPTION OF THE DRAWINGS

FIG. 1 shows the UV/VIS spectra of three different 2-amino benzophenone UV absorbers in an acrylic IOL material.

DETAILED DESCRIPTION OF THE INVENTION

Unless indicated otherwise, all ingredient amounts expressed in percentage terms are presented as % w/w.

The UV absorbers contained in the ophthalmic device materials of the present invention have the structure shown in formula I.

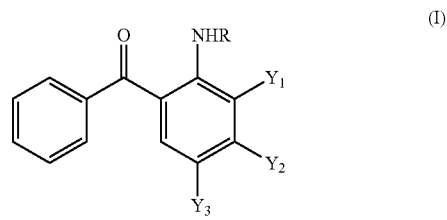

(I)

wherein:

R is H, $C_1$-$C_4$ alkyl, —C(=O)C(=CH$_2$)X, or —C(=O)O—(CH$_2$)$_n$O—C(=O)C(=CH$_2$)X;

n is 1-6;

X is H, CH$_3$, or CH$_2$CH$_3$;

Y$_1$, Y$_2$ independently are H, Br, Cl, F, I, OCH$_3$, NO$_2$, —C(=O)C(=CH$_2$)X, or —C(=O)O—(CH$_2$)$_n$O—C(=O)C(=CH$_2$)X; and Y$_3$ is H, Br, Cl, F, I, OCH$_3$, or NO$_2$;

provided that no more than one of R, Y$_1$, and Y$_2$ may be —C(=O)C(=CH$_2$)X or —C(=O)O—(CH$_2$)$_n$O—C(=O)C(=CH$_2$)X.

Preferably,

R is H or $C_1$-$C_4$ alkyl;

n is 1-6;

X is H, CH$_3$, or CH$_2$CH$_3$;

Y$_1$, Y$_2$ independently are H, Br, Cl, F, I, OCH$_3$, NO$_2$, —C(=O)C(=CH$_2$)X, or —C(=O)O—(CH$_2$)$_n$O—C(=O)C(=CH$_2$)X; and Y$_3$ is Br, Cl, F, I, OCH$_3$, or NO$_2$;

provided that no more than one of Y$_1$ and Y$_2$ may be —C(=O)C(=CH$_2$)X or —C(=O)O—(CH$_2$)$_n$O—C(=O)C(=CH$_2$)X.

More preferably,

R is H or $C_1$-$C_4$ alkyl;

n is 1-6;

X is H or CH$_3$;

Y$_1$, Y$_2$ independently are H, Br, Cl, F, I, OCH$_3$, NO$_2$, —C(=O)C(=CH$_2$)X, or —C(=O)O—(CH$_2$)$_n$O—C(=O)C(=CH$_2$)X; and Y$_3$ is Cl;

provided that no more than one of Y$_1$ and Y$_2$ may be —C(=O)C(=CH$_2$)X or —C(=O)O—(CH$_2$)$_n$O—C(=O)C(=CH$_2$)X.

Representative compounds of formula I are the following:

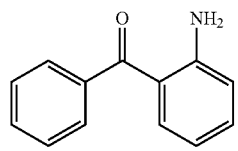

2-amino benzophenone (II)

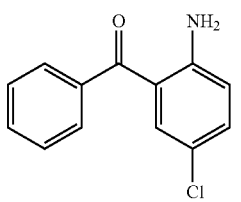

2-amino-5-chloro benzophenone (III)

Compounds of formula (I) are commercially available or can be prepared using methods known in the art. For example, a synthetic pathway to prepare the polymerizable compounds of the present invention is to place the desired amino benzophenone into a flask in dichloromethane. Add a slight excess of amine catalyst followed by acryloyl chloride. Alternatively, the polymerizable compounds can be prepared by adding isocyanatoethyl methacrylate to the desired amino benzophenone.

The ophthalmic device materials of the present invention are particularly suitable for use in IOLs. IOL materials will generally contain from 0.1 to 5% (w/w) of a UV absorber of formula I. Preferably, IOL materials will contain from 0.1 to 4% (w/w) of a UV absorber of the present invention. Most preferably, IOL materials will contain from 1 to 3% (w/w) of a UV absorber of the present invention.

Ophthalmic device materials are prepared by copolymerizing a UV absorber of formula (I) with a device-forming monomer, a cross-linking agent, and, if desired, a blue-light blocking chromophore.

Many device-forming monomers are known in the art and include both acrylic and silicone-containing monomers among others. See, for example, U.S. Pat. Nos. 7,101,949; 7,067,602; 7,037,954; 6,872,793 6,852,793; 6,846,897; 6,806,337; 6,528,602; and 5,693,095. In the case of IOLs, any known IOL device material is suitable for use in the compositions of the present invention. Preferably, the ophthalmic device materials comprise an acrylic or methacrylic device-forming monomer. More preferably, the device-forming monomers comprise a monomer of formula V:

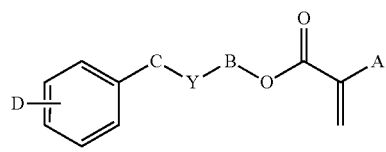

wherein in formula V:
A is H, $CH_3$, $CH_2CH_3$, or $CH_2OH$;
B is $(CH_2)_m$ or $[O(CH_2)_2]_z$;
C is $(CH_2)_w$;
m is 2-6;
z is 1-10;
Y is nothing, O, S, or NR', provided that if Y is O, S, or NR', then B is $(CH_2)_m$;
R' is H, $CH_3$, $C_nH_{2n'+1}$ (n'=1-10), iso-$OC_3H_7$, $C_6H_5$, or $CH_2C_6H_5$;
w is 0-6, provided that m+w≦8; and
D is H, $C_1$-$C_4$ alkyl, $C_1$-$C_4$ alkoxy, $C_6H_5$, $CH_2C_6H_5$ or halogen.

Preferred monomers of formula V are those wherein A is H or $CH_3$, B is $(CH_2)_m$, m is 2-5, Y is nothing or O, w is 0-1, and D is H. Most preferred are 2-phenylethyl methacrylate; 4-phenylbutyl methacrylate; 5-phenylpentyl methacrylate; 2-benzyloxyethyl methacrylate; and 3-benzyloxypropyl methacrylate; and their corresponding acrylates.

Monomers of formula V are known and can be made by known methods. For example, the conjugate alcohol of the desired monomer can be combined in a reaction vessel with methyl methacrylate, tetrabutyl titanate (catalyst), and a polymerization inhibitor such as 4-benzyloxy phenol. The vessel can then be heated to facilitate the reaction and distill off the reaction by-products to drive the reaction to completion. Alternative synthesis schemes involve adding methacrylic acid to the conjugate alcohol and catalyzing with a carbodiimide or mixing the conjugate alcohol with methacryloyl chloride and a base such as pyridine or triethylamine.

The ophthalmic device materials of the present invention generally comprise a total of at least about 75%, preferably at least about 80%, of device-forming monomers.

In addition to a UV absorber of formula I and a device-forming monomer, the device materials of the present invention generally comprise a cross-linking agent. The cross-linking agent used in the device materials of this invention may be any terminally ethylenically unsaturated compound having more than one unsaturated group. Suitable cross-linking agents include, for example: ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; $CH_2$=$C(CH_3)C$(=O)O—$(CH_2CH_2O)_p$—C(=O)$C(CH_3)$=$CH_2$ where p=1-50; and $CH_2$=$C(CH_3)C$(=O)O$(CH_2)_tO$—C(=O)$C(CH_3)$=$CH_2$ where t=3-20; and their corresponding acrylates. A preferred cross-linking monomer is $CH_2$=$C(CH_3)C$(=O)O—$(CH_2CH_2O)_p$—C(=O)$C(CH_3)$=$CH_2$ where p is such that the number-average molecular weight is about 400, about 600, or about 1000.

Generally, the total amount of the cross-linking component is at least 0.1% by weight and, depending on the identity and concentration of the remaining components and the desired physical properties, can range to about 20% by weight. The preferred concentration range for the cross-linking component is 0.1-17% (w/w).

Suitable polymerization initiators for the device materials of the present invention include thermal initiators and photo initiators. Preferred thermal initiators include perm free-radical initiators, such as t-butyl (peroxy-2-ethyl)hexanoate and di-(tert-butylcyclohexyl) peroxydicarbonate (commercially available as Perkadox® 16 from Akzo Chemicals Inc., Chicago, Ill.). Initiators are typically present in an amount of about 5% (w/w) or less. Because free-radical initiators do not become chemically a part of the polymers formed, the total amount of initiator is customarily not included when determining the amounts of other ingredients.

The device materials of the present invention optionally contain a reactive colorant. Suitable reactive blue-light absorbing compounds include those described in U.S. Pat. No. 5,470,932. Blue-light absorbers are typically present in the device materials of the present invention in an amount from about 0.01-0.5% (weight).

IOLs constructed of the device materials of the present invention can be of any design capable of being rolled or folded into a small cross section that can fit through a relatively smaller incision. For example, the IOLs can be of what is known as a one piece or multipiece design, and comprise optic and haptic components. The optic is that portion which serves as the lens. The haptics are attached to the optic and hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the device materials of the present invention are also suitable for use in other ophthalmic devices, such as contact lenses, keratoprostheses, and corneal inlays or rings.

The invention will be further illustrated by the following examples, which are intended to be illustrative, but not limiting.

Examples 1-3

Preparation of IOL Materials Incorporating UV Absorbers of Formulas II-IV

The monomers 2-phenylethyl acrylate (66.1 wt. %), 2-phenylethyl methacrylate (30.6 wt. %), and the crosslinker 1,4-butanediol diacrylate (3.3 wt. %) are weighed into a vial and shaken to mix. Azobisisobutyronitrile thermal initiator (2 wt. %) is then added and shaken to mix. Nitrogen is bubbled into the mix. This master batch is then divided into separate clean vials and approximately 3 wt. % of the desired benzophenone absorber is added. The solutions are then placed into polypropylene molds and then into an oven for curing. The cured slabs are placed into methanol for 25 minutes. Fresh methanol is added then decanted and the slabs allowed to slowly dry. Subsequently, they are placed into a vacuum oven to remove the solvent. The UV-visible transmission spectrum of each lens material was measured. The measurement was performed from 850 to 250 nm in 1-mm quartz cuvettes using a Perkin-Elmer Lambda 35 UV-Visible Spectrophotometer. The results are shown in FIG. 1.

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

I claim:

1. A polymeric ophthalmic device material formed by polymerizing a composition comprising
a) 0.1 to 5% (w/w) of a UV absorber of formula (I):

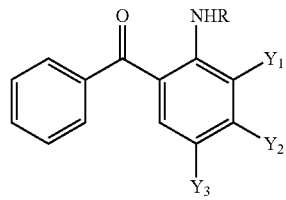

wherein in formula (I):
R is H, $C_1$-$C_4$ alkyl, —C(=O)C(=CH$_2$)X, or —C(=O)O—(CH$_2$)$_n$O—C(=O)C(=CH$_2$)X;

n is 1-6;
X is H, CH$_3$, or CH$_2$CH$_3$;
Y$_1$, Y$_2$ independently are H, Br, Cl, F, I, OCH$_3$, NO$_2$, —C(=O)C(=CH$_2$)X, or —C(=O)O—(CH$_2$)$_n$O—C(=O)C(=CH$_2$)X; and
Y$_3$ is H, Br, Cl, F, I, OCH$_3$, or NO$_2$;
provided that no more than one of R, Y$_1$, and Y$_2$ may be —C(=O)C(=CH$_2$)X or —C(=O)O—(CH$_2$)$_n$O—C(=O)C(=CH$_2$)X; and
b) a device-forming monomer selected from the group consisting of acrylic monomers and silicone-containing monomers.

2. The ophthalmic device material of claim 1 wherein in formula (I)
R is H or $C_1$-$C_4$ alkyl;
n is 1-6;
X is H, CH$_3$, or CH$_2$CH$_3$;
Y$_1$, Y$_2$ independently are H, Br, Cl, F, I, OCH$_3$, NO$_2$, —C(=O)C(=CH$_2$)X, or —C(=O)O—(CH$_2$)$_n$O—C(=O)C(=CH$_2$)X; and
Y$_3$ is Br, Cl, F, I, OCH$_3$, or NO$_2$;
provided that no more than one of Y$_1$ and Y$_2$ may be —C(=O)C(=CH$_2$)X or —C(=O)O—(CH$_2$)$_n$O—C(=O)C(=CH$_2$)X.

3. The ophthalmic device material of claim 2 wherein in formula (I)
R is H or $C_1$-$C_4$ alkyl;
n is 1-6;
X is H or CH$_3$;
Y$_1$, Y$_2$ independently are H, Br, Cl, F, I, OCH$_3$, NO$_2$, —C(=O)C(=CH$_2$)X, or —C(=O)O—(CH$_2$)$_n$O—C(=O)C(=CH$_2$)X; and
Y$_3$ is Cl;
provided that no more than one of Y$_1$ and Y$_2$ may be —C(=O)C(=CH$_2$)X or —C(=O)O—(CH$_2$)$_n$O—C(=O)C(=CH$_2$)X.

4. The ophthalmic device material of claim 1 wherein the UV absorber is selected from the group consisting of: 2-amino benzophenone, 2-amino-5-chloro benzophenone, and 2-methylamino-5-chloro benzophenone.

5. The ophthalmic device material of claim 1 wherein the composition comprises from 0.1 to 4% (w/w) of the UV absorber.

6. The ophthalmic device material of claim 5 wherein the composition comprises from 1 to 3% (w/w) of the UV absorber.

7. The ophthalmic device material of claim 1 wherein the composition comprises a device-forming monomer of formula [V]:

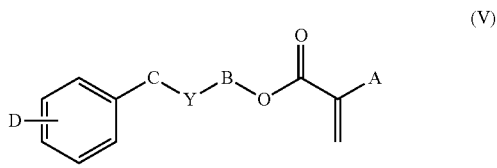

where in formula [V]:
A is H, CH$_3$, CH$_2$CH$_3$, or CH$_2$OH;
B is (CH$_2$)$_m$ or [O(CH$_2$)$_2$]$_z$;
C is (CH$_2$)$_w$;
m is 2-6;
z is 1-10;
Y is nothing, O, S, or NR', provided that if Y is O, S, or NR', then B is (CH$_2$)$_m$;

R' is H, CH$_3$, C$_n$H$_{2n'+1}$ (n'=1-10), iso-OC$_3$H$_7$, C$_6$H$_5$, or CH$_2$C$_6$H$_5$;

w is 0-6, provided that m+w≦8; and

D is H, C$_1$-C$_4$ alkyl, C$_1$-C$_4$ alkoxy, C$_6$H$_5$, CH$_2$C$_6$H$_5$ or halogen.

8. The ophthalmic device material of claim 7 wherein in formula [V]:

A is H or CH$_3$;

B is (CH$_2$)$_m$;

m is 2-5;

Y is nothing or O;

w is 0-1; and

D is H.

9. The ophthalmic device material of claim 8 wherein the composition comprises a monomer selected from the group consisting of: 2-phenylethyl methacrylate, 4-phenylbutyl methacrylate, 5-phenylpentyl methacrylate, 2-benzyloxyethyl methacrylate, 3-benzyloxypropyl methacrylate, 2-phenylethyl acrylate, 4-phenylbutyl acrylate, 5-phenylpentyl acrylate, 2-benzyloxyethyl acrylate, and 3-benzyloxypropyl acrylate.

10. The ophthalmic device material of claim 1 wherein the composition comprises a cross-linking agent.

11. The ophthalmic device material of claim 1 wherein the composition comprises a reactive blue-light absorbing compound.

12. An ophthalmic device comprising an ophthalmic device material of claim 1, wherein the ophthalmic device is selected from the group consisting of an intraocular lens, a contact lens, a keratoprosthesis, and a corneal inlay or ring.

13. The ophthalmic device of claim 12 wherein the ophthalmic device is an intraocular lens.

\* \* \* \* \*